June 22, 1937. P. ROTTÉE 2,084,656
SELF LOADING REFUSE VEHICLE
Filed Nov. 16, 1935 7 Sheets-Sheet 1

INVENTOR
PIERRE ROTTEÉ
BY Haseltine, Lake & Co.
ATTORNEYS

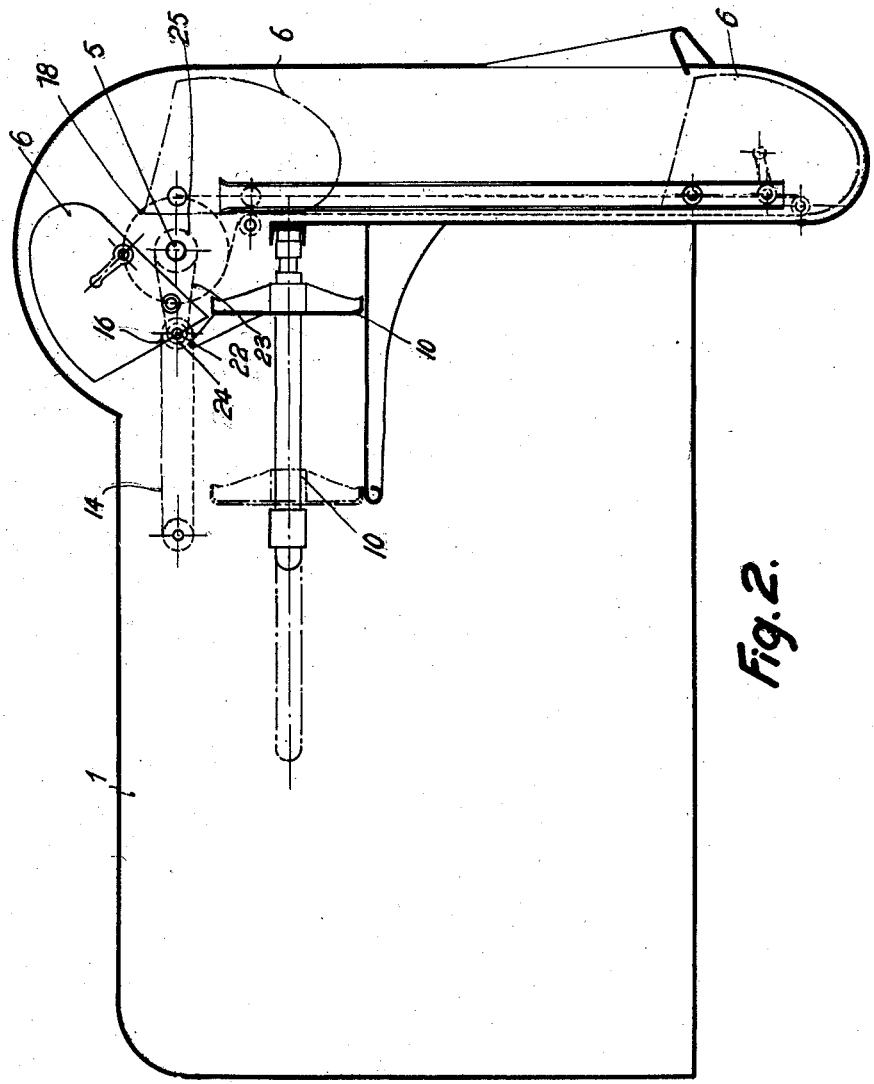

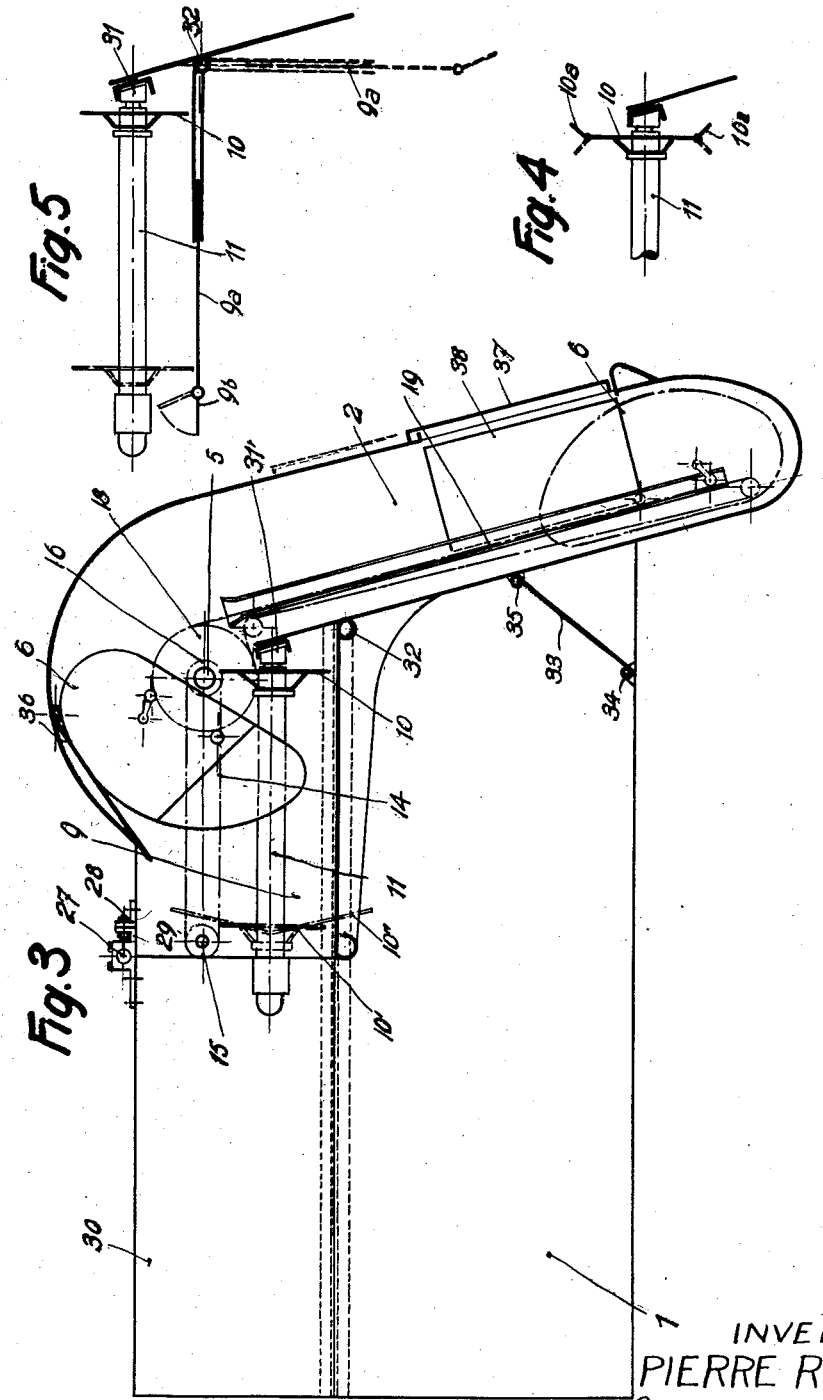

INVENTOR
PIERRE ROTTEÉ
BY Haseltine, Lake & Co.
ATTORNEYS

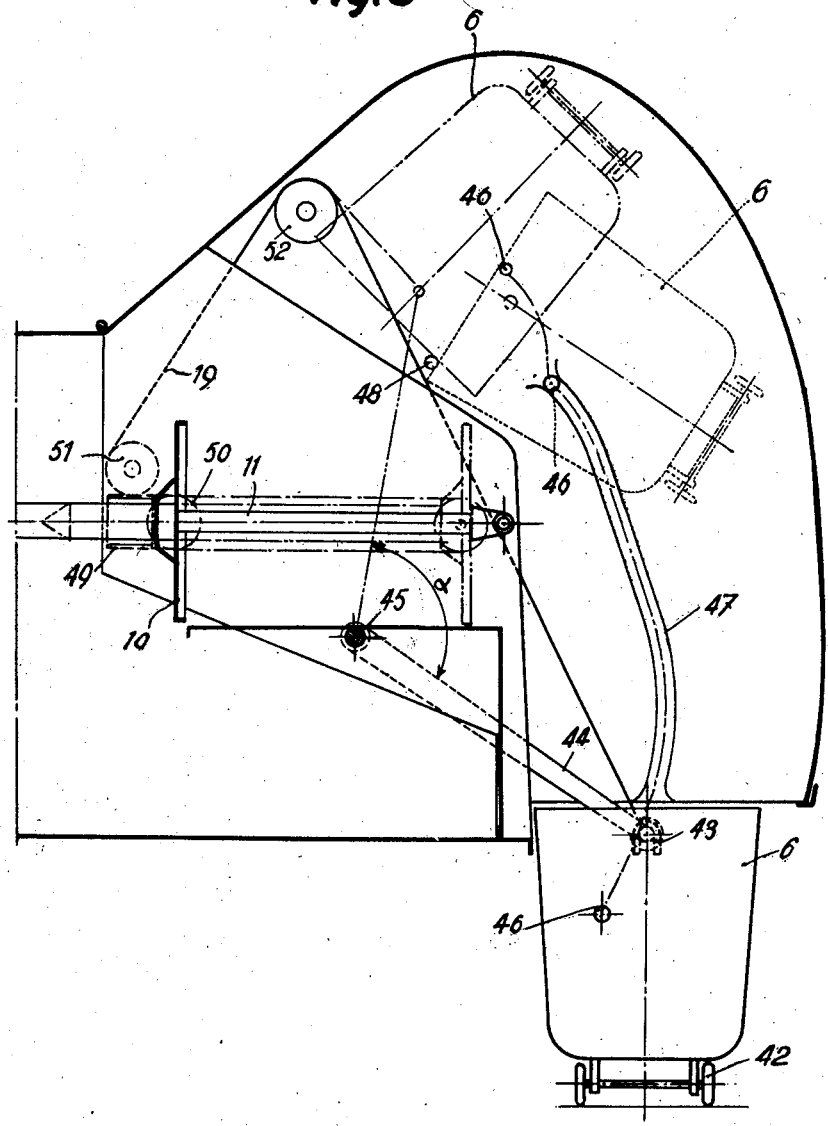

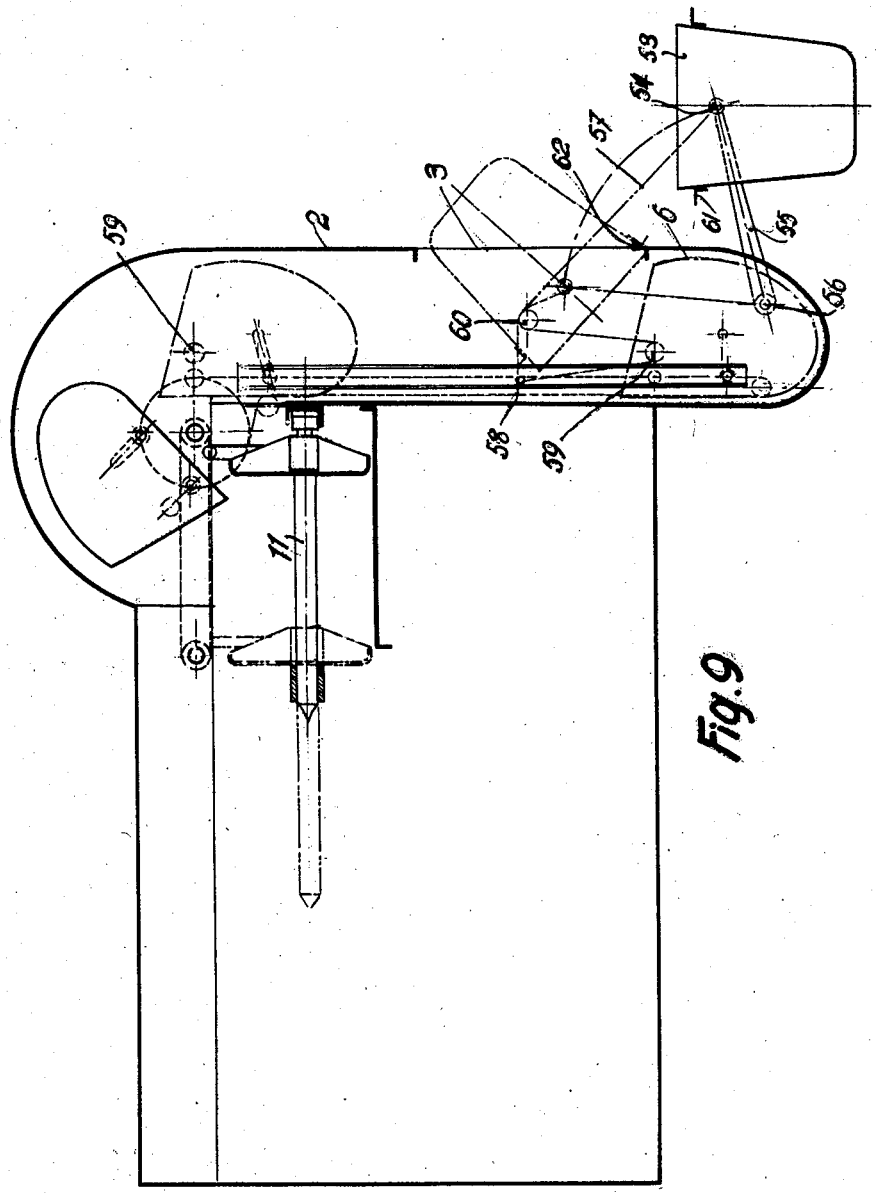

June 22, 1937.   P. ROTTEÉ   2,084,656
SELF LOADING REFUSE VEHICLE
Filed Nov. 16, 1935    7 Sheets-Sheet 7

INVENTOR
PIERRE ROTTEE
BY Haseltine, Lake & Co.
ATTORNEYS

Patented June 22, 1937

2,084,656

UNITED STATES PATENT OFFICE 2,084,656

SELF-LOADING REFUSE VEHICLE

Pierre Rotteé, Paris, France, assignor to Fernand Geneve, Paris, France

Application November 16, 1935, Serial No. 50,139
In France March 26, 1934

8 Claims. (Cl. 214—67)

The present invention relates to self loading refuse vehicle, and especially those employed for the handling of refuse, including loading cups or skips into which refuse or waste is poured at the rear end of the box of the vehicle, said cups being driven by a mechanism which lifts them to the upper part of the box and then tips them.

There exist already systems of buckets of this kind in which the refuse lifting and discharging mechanism is combined with a mechanism for distributing the waste or refuse discharge into the box, by means of a scraping member. These systems are so arranged that the scraping member moves to the rear of the point where the waste or refuse is discharged by the cup while the latter is moving upwardly, said scraping member being arranged to push said waste or refuse in front of it while the cup is moving downward, the mechanisms above referred to being driven simultaneously in synchronism.

Experience has taught that distributing devices of this kind do not give complete satisfaction and it has been endeavoured to increase as much as possible the capacity of a bucket of a given size.

For this purpose, many devices for compressing waste or refuse inside the box of the bucket have already been suggested. However, such compressing devices could not be used in combination with systems in which the lifting and the distribution of refuse are combined, as above mentioned. This is due to the fact that in these systems, as they existed prior to the present invention, the driving action was exerted directly on the lifting mechanism and only indirectly on the distributing mechanism.

In view of the considerable efforts that are required for pressing refuse in the box of the bucket, the transmission means interposed between the driving system and the compressing plate or panel would be subjected to exaggerated stress, and therefore would quickly deteriorate.

The object of the present invention is to provide a tipping bucket of the type above referred to which obviates these drawbacks.

The essential feature of the present invention lies in the fact that the driving system which operates simultaneously both the refuse compressing mechanism and the loading cup lifting mechanism acts directly on the compressing plate or panel, preferably through a hydraulic jack, which directly produces the reciprocating movement of said plate or panel, and makes it possible to exert considerable pressure.

Therefore, according to the present invention, a portion of this movement of the compressing plate or panel is transformed and transmitted through suitable means to the lifting mechanisms, which require much less power.

Besides, it will be noted that in known systems, the compression is effected on the whole height of the bucket, which, for a bucket of large volume, requires very great power effort.

In the device according to the present invention, on the contrary, the compression of waste or refuse inside the box is effected only on a part of the path traversed by the bucket, said bucket being, for this purpose, provided under the point of discharge of the cup with a hopper into which refuse is poured from said cup and in which the compressing plate or panel is disposed.

This unit, including a lifting device and a hopper with the compressing plate or panel therein, may be disposed inside a casing or relatively small volume which is itself adapted to tip or pivot about a horizontal axis and constitutes the rear gate of the material receiving box structure or bucket.

Preferred embodiments of the present invention will be hereinafter described, with reference to the accompanying drawings, given merely by way of example, and in which:

Fig. 2 is a corresponding view relating to another embodiment;

Fig. 3 is a similar view of still another embodiment in which the loading and compressing mechanisms are associated together so as to form a single unit;

Figs. 4 and 5 are detail sectional views relating to modifications;

Figs. 8 and 9 are vertical sectional views of two other embodiments;

Figure 1:
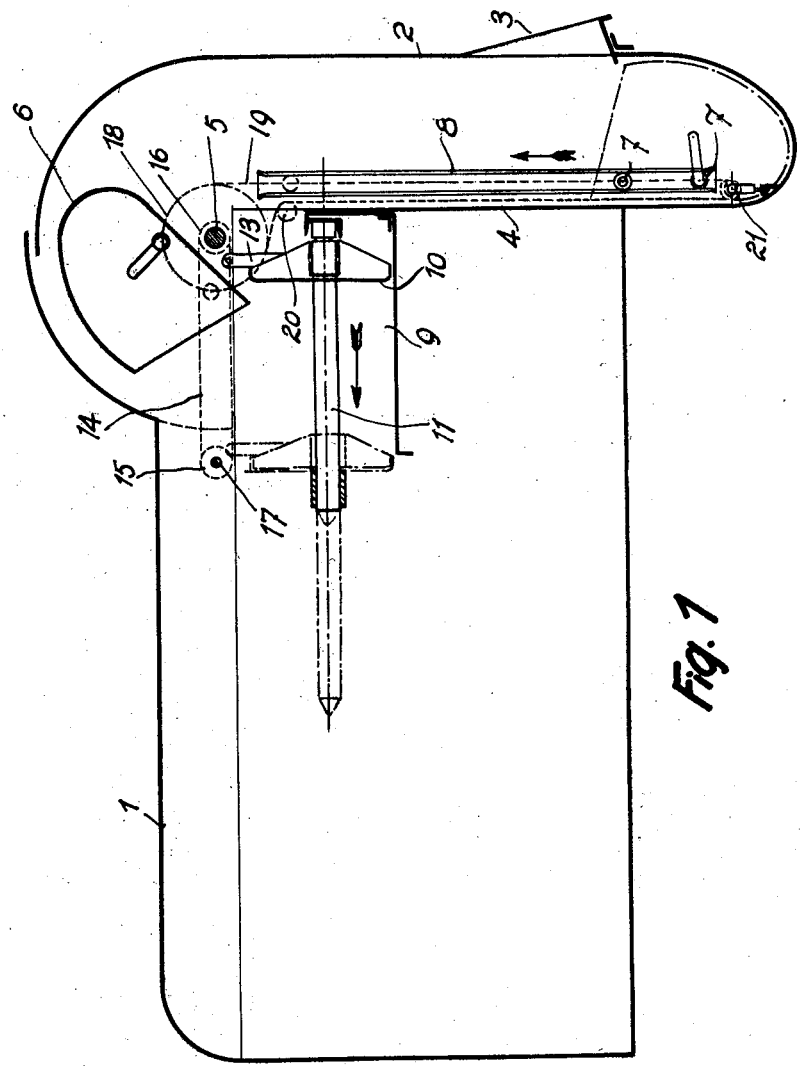
Fig. 1 is a longitudinal vertical section of a bucket made according to the present invention.

The bucket shown in Fig. 1 includes a box 1 into which refuse is to be loaded, the rear wall 2 being provided with the loading apparatus 3. Wall 4 closes the box and the whole of walls 2 and 4 constitutes the loading gate, which can be opened by pivoting about axis 5. The loading cup 6 is guided against lateral movement by rollers 7 moving in grooves 8.

At the end of its upward movement, this cup pivots about axis 5 and its contents drop into hopper 9, which may have a bottom extending to the sides of the box. A plate or panel 10, subjected to the action of jacks 11, disposed preferably in lateral position on either side of box 1, is adapted to move inside this hopper 9. This plate or panel 10 may extend toward the sides of the box so that the sides and hopper bottom constitute the hopper. Preferably, axis 5 coincides, in this embodiment, with the axis about which walls 2—4 can pivot, in such manner that, when opening this unit, cup 6 being in its upper position, the center of gravity of this cup may be located very close to this axis of rotation, which facilitates the opening of the system of panels 2—4.

According to the invention, the upward movement of cup 6 is produced by a plunger or jack (or preferably two jacks) 11, directly connected with compressing plate or panel 10, through the following transmission mechanism: These jacks are connected, on either side of box 1, through a lever 13, with one of the links of a chain 14 passing around two pinions 15 and 16. Pinion 15 turns about axis 17 and pinion 17 is keyed on spindle 5. Both of these axes 17 and 5 are disposed in a common horizontal plane, in such manner that the two portions of the chain move parallelly to the direction of displacement of the jack.

On spindle 5, there is further keyed a sprocket wheel 18 around which passes an endless chain 19, both of the portions of which, after having passed around rollers 20 and 21, move parallelly to walls 2 and 4, one of these portions of the chain extending through the guide way 8. On the other hand, the guiding rollers 7 of the cup are fixed to two links of chain 19. The ratio of the diameters of pinions 16 and 18 is calculated in accordance with the relative amplitude of the longitudinal displacements imparted to chains 14 and 19.

In the embodiment of Fig. 2, pinion 16 is mounted about an axis 22 distinct from the axis 5 of pinion 18. The connection between the two mechanisms is then obtained through any suitable means, such as an endless chain 23 winding around two pinions 24 and 25, which are keyed on spindles 22 and 5, respectively.

This device works in the following manner:

The compressing plate 10 being supposed to be at the end of its movement toward the left-hand side, that is to say in the position shown in dotted lines, the loading cup 6 is then at the lower part of the apparatus. The return movement of the jacks toward the right hand side produces, through levers 13 and chain 14, a rotation of spindle 5 and pinion 18, and therefore a displacement of chain 19 in the direction of the arrow. Cup 6, which is fixed to this last mentioned chain, follows this movement and moves upwardly in the space between walls 2 and 4. It pivots, at the end of its upward stroke, about spindle 5 and its contents drop into hopper 9 just when compressing plate 10 has come back to the end of its movement toward the right hand side, whereby the hopper is then unobstructed. The movement of this plate 10 toward the left hand side under the action of the jacks produces a downward movement of cup 6, which is thus returned into its initial position, shown in dotted lines, at the bottom of the space between walls 2 and 4.

It will be noted that jacks 11 may also produce the opening and the lifting of the rear gate in due time, by working on the same principle.

In the devices that have just been described, the unit 2—4, which forms the unloading gate of the box, pivots about the spindle 5 of pinion 18. It follows that, even when this gate is open, a portion of the inside of the box is masked by plate 10 and the loading mechanism.

On the contrary, with the arrangement according to the embodiment of Fig. 3, the whole of gate 2—4 and hopper 9 in which the compressing plate is movable, forms a single unit which is mounted in such manner as to pivot about an axis 27, provided at the upper part of the box. It follows that, when this unit is opened, the rear of the box is wholly unobstructed, which permits a quick and easy unloading of the box, however much compressed the refuse material or matters may be inside said box.

On the other hand, this whole unit is mounted in a common casing, which may be easily detached, so as to permit repairing, the unit thus detached being then replaced by a similar unit, which greatly reduces the time for which a vehicle is out of service.

It will be also noted that, in the device shown by Fig. 3, gate 2, and the loading mechanism it contains, is inclined with respect to the vertical direction, which better distributes the loads and facilitates the tipping of the box. Also, the point at which the matters are dropped into the box is moved forward with respect to the rear of the box, which facilitates the distribution of the matters at the beginning of the loading operation.

In order to permit of more easily replacing a unit 2—9 by another unit, the connection between this unit 2—9 and the pivotal axis 27 preferably includes a part 28, rigid with said unit and adapted to be removably fixed to the pivoting part 29 of the hinge.

Owing to this arrangement, the unit can be detached without touching the pivotal axis, the feed joints or the transmission shafts of the lifting, compressing and distributing device.

As a matter of fact, in some cases, the removable part of the box, which consists essentially of the rear gate and hopper 9, may also include the upper part 30 of the box. When this part is removed, there remains on the vehicle only a usual bucket or vehicle body of the type commonly used in civil engineering.

Fig. 3 shows various auxiliary arrangements intended to facilitate the working of the compressing plate or panel for the filling of the box. For instance the jack 11 by which plate 10 is operated may be made pivotable about axis 31, as shown in dotted lines at 10', 10''; in this case, the lower face of the hopper shall also pivot, about axis 32.

The adjustment of the inclination of these parts may be made before loading, or even during the filling operation, through any suitable control means.

The bottom 9a of the hopper may also be made pivotable separately about axis 32, and its length may be made adjustable as shown in Fig. 5. Its end 9b may also be pivotally connected to main part thereof, as shown in dotted lines in Fig. 5.

In a likewise manner, the ends 10a of plate 10 may be adjustably inclined with respect to the main portion of said plate (Fig. 4) so as to facilitate the compression of some matters.

In some cases, the bottom of the hopper may be wholly dispensed with. In this case, the compressing plate acts only when the matters dropped into the box reach the level of the lower edge of this compression plate. Besides, I may, according to the invention, provide a foldable plate element 33, pivoted either to the bottom of the bucket at 34, or to the gate at 35, as shown by Fig. 3, so as to permit a better distribution of the matters.

In order to facilitate the loading of some matters, which have a tendency to swell, such for instance as straw, it may be advantageous to provide, either behind or close to the compressing mechanism, checking members, consisting for instance of flaps 36, which are pushed out of the way so as to permit the passage of the loading cups 6, when the latter bring the matters toward the box, said flaps being closed back as soon as the cups move rearward, so as to maintain the matters in the compression hopper while avoiding clogging of the chamber into which the matters are poured.

Similar devices might be provided at the outlet of the compression hopper.

The loading device proper, that is to say the device for pouring the matters into cup 6 when the latter is in the lower position, may be arranged in various manners.

Figure 11:
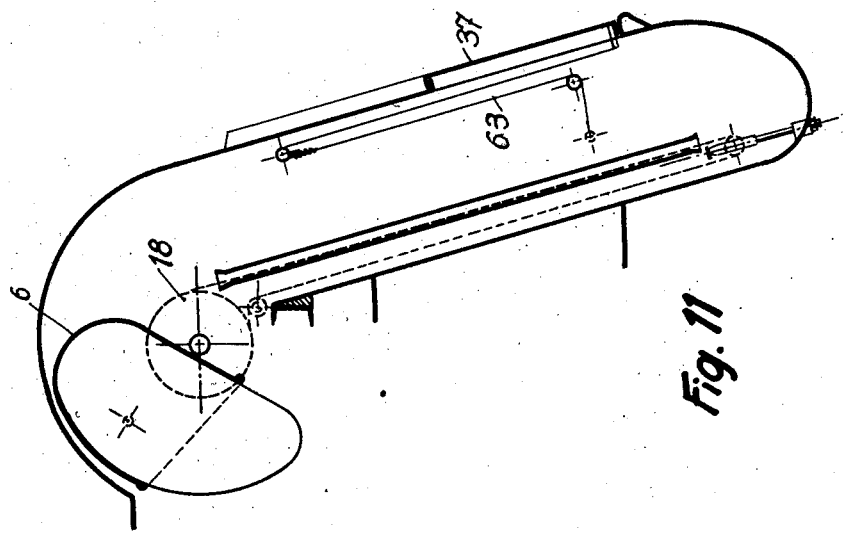
Figs. 10 and 11 show a gate automatic control mechanism for use with the arrangement of Fig. 3.
Figure 10:
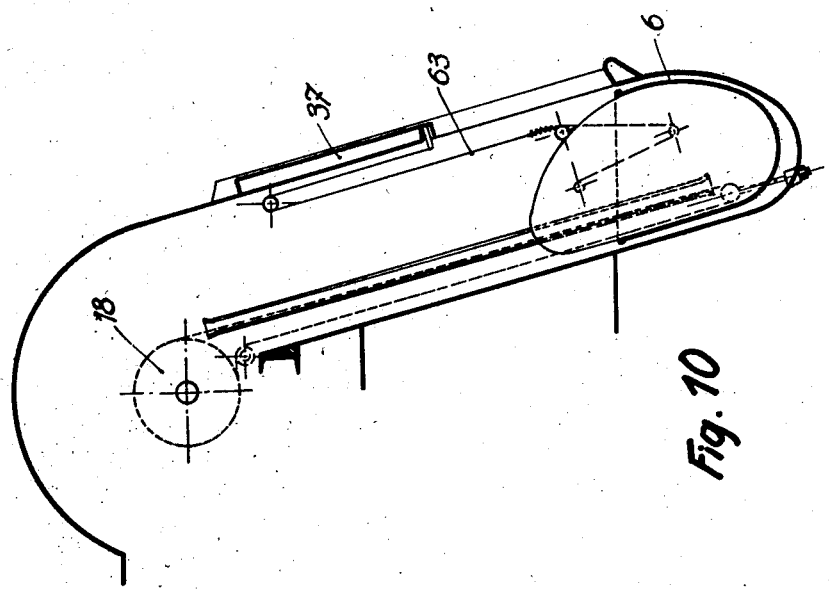

In the embodiment of Fig. 3, three doors are provided at the rear part of the box-like structure 2, to wit: a rear door 37 and two lateral doors 38. These doors may, as diagrammatically shown in Figs. 10 and 11, be automatically controlled, in accordance with the working of the lifting mechanism, through a chain or cable control arrangement 63, in such manner that the doors open during the compressing operation, that is to say while cup 6 is moving downwardly (Fig. 10) and close while cup 6 is moving upwardly (Fig. 11).

Figure 6:
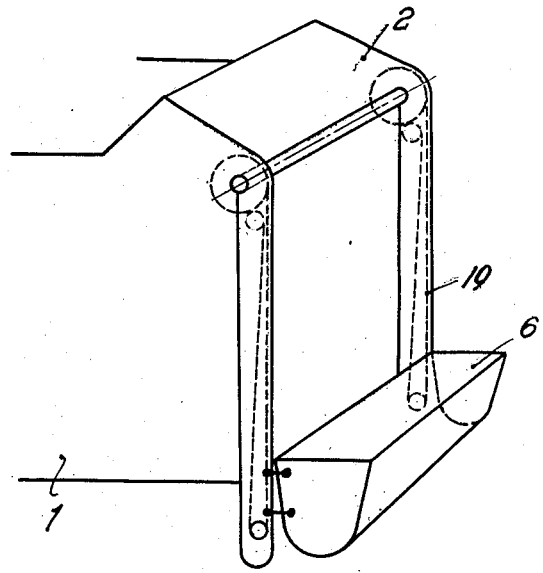
Figs. 6 and 7 are perspective views of devices for pouring refuse into the loading cup of the bucket.
Figure 7:
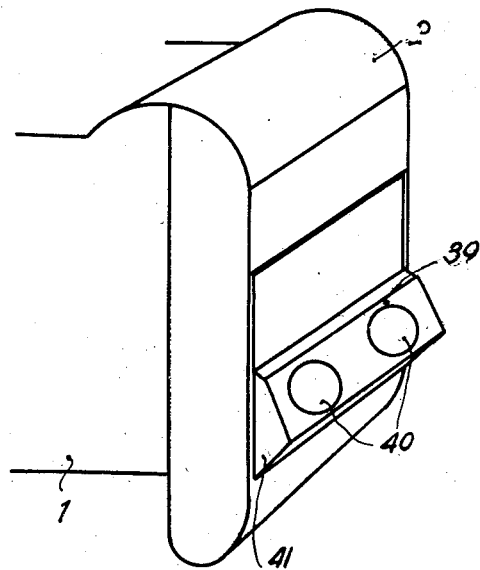

In the embodiment of Fig. 6, on the contrary, the loading cup is disposed wholly on the outside, so as to render it accessible from all sides.

When the device is to be loaded through collecting vessels, I may provide a loading gate 39 having orifices 60 intended to fit with garbage cans of a standard type provided with lids. The hopper 41 on which this gate 39 can be fitted is provided with a device for the fixation of the cans opposite the orifices 40 with which it is provided. Preferably these orifices are closed by means of lids fitting the orifices and the opening of which may be automatically produced in conventional manner, not shown, by the fixation of the cans. The operation of these valves themselves actuates the locking device of the lifting mechanism and of the compressing mechanism.

In the mechanism of Fig. 8, the loading cup 6 (which is preferably provided with rollers 42 permitting it to be brought separately from the point where the matters are collected to the bucket) is secured, preferably in a removable manner, through gudgeons 43, with a pair of levers 44, themselves pivoted about an axis fixed with respect to the box.

It results clearly from the drawings that a rotation of this lever through an angle α brings cup 6 above the compressing plate or panel 10. In order to ensure the simultaneous tipping of this cup, the latter is provided with rollers 46, guided in rails 47, the whole being devised in such manner as to keep the loading cup in a substantially vertical position during its upward movement and then to pivot it about its gudgeon 43 at the end of this upward movement.

As a matter of fact, rails 47 do not necessarily extend along the whole of the path of the rollers, and they may be dispensed with at the end of the said path, as shown by the drawings, since the tipping of the loading cup is ensured through the edge thereof butting against a fixed stop 48.

The connecting mechanism between the compressing plate or panel, actuated by a jack 11, and lever 44 may consist, as above, of a system including a chain 19 fixed on the one hand at 43 to cup 6 and on the other hand to a fixed point 49 and passing around pinion 50, fixed to plate 10, and stationary pinions 51 and 52.

It results clearly from the drawings that the rearward movement of plate 10 shall cause cup 6 to move upwardly, and inversely.

In the embodiment of Fig. 9, the system includes, in addition to the usual cup 6, a collecting cup 53 pivotally carried at 54 by a pair of levers 55 themselves pivoted to the frame of the bucket at a fixed point 56 thereof.

As it is obvious from the drawings, the matters will be loaded into cup 53, the contents of which will be poured into cup 6, connected to the jack driving mechanism through the mechanism shown in Fig. 1. This collecting cup 53 is itself connected with the general actuating system through any suitable means, for instance a mechanism including a chain 57, fixed, on the one hand to said cup 53 at 54, and, on the other hand, to a stationary point at 58, said chain passing around two pinions 59 and 60, one of which is fixed to cup 6, while the other one is fixed to the frame. In the inactive position, shown in solid lines, the chain extends from fixed point 54 to fixed point 58, passing around pinion 60.

On the contrary, when cup 6 moves in a downward direction, its pinion 59 comes into contact with chain 57, thus causing lever 55 to turn upwardly about its axis 56 and cup 53 to move upwardly. The tipping of cup 53 will be ensured by stops 61 butting against the edge 62 of the aperture 3 provided in the rear wall 2 of the bucket.

It is therefore clear that, as in the preceding cases, the whole mechanism is driven from jack 11. On the other hand, it should be noted that the collecting vessel 53 is located at a very small height from the ground so that the loading thereof is facilitated.

Furthermore, as this collecting cup 53 is in its lower position (position in full lines) while the main cup 6 is moving upwardly, this arrangement permits of avoiding any loss of time during the working of said main cup.

While I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A traveling bucket for conveying refuse or other material, comprising in combination, a box structure made in two parts consisting of an upper and a lower part, a compression plate reciprocable in said box structure in a direction transverse to its surface for compressing and distributing the refuse material in said box, at least one jack directly interposed between said box structure and said plate for actuating said compressing plate, at least one cup for said refuse material movably connected with said structure so as to allow lifting of the refuse material and discharging of the same into said box structure, and a mechanism for transmitting the motion from said jack to said cup in order to operate said cup in cooperation with the working of said compression plate, the upper part of the box structure corresponding to the zone of action of the compression plate and being detachable so as to allow the box structure to be used as an ordinary bucket or vehicle body of a usual type.

2. A traveling bucket for conveying refuse or other material, comprising in combination, a box structure, a compression plate reciprocable in said box structure in a direction transverse to its surface for compressing and distributing the refuse material in said box, at least one jack directly interposed between said box structure and said plate for actuating said compressing plate, at least one cup for said refuse material movably connected with said structure so as to allow lifting of the refuse material and discharging of the same into said box structure, a mechanism for transmitting the motion from said jack to said cup in order to operate said cup in cooperation with the working of said compression plate, and a hopper disposed in said box structure under the point at which the refuse material is discharged from said cup, said compressing plate being arranged inside the zone of said hopper, and the whole of said hopper, said compression plate and the jack for driving said plate being pivotally mounted inside the box structure about a horizontal axis.

3. A traveling bucket for conveying refuse or other material, comprising in combination, a box structure, a compression plate reciprocable in said box structure in a direction transverse to its surface for compressing and distributing the refuse material in said box, at least one jack directly interposed between said box structure and said plate for actuating said compressing plate, at least one cup for said refuse material movably connected with said structure so as to allow lifting of the refuse material and discharging of the same into said box structure, a mechanism for transmitting the motion from said jack to said cup in order to operate said cup in cooperation with the working of said compression plate, a hopper including a bottom disposed in said box structure under the point at which the refuse material is discharged from said cup, and means for adjusting the length of the bottom of said hopper.

4. A traveling bucket for conveying refuse or other material, comprising in combination, a box structure, a compression plate reciprocable in said box structure in a direction transverse to its surface for compressing and distributing the refuse material in said box, at least one jack directly interposed between said box structure and said plate for actuating said compressing plate, at least one cup for said refuse material movably connected with said structure so as to allow lifting of the refuse material and discharging of the same into said box structure, a mechanism for transmitting the motion from said jack to said cup in order to operate said cup in cooperation with the working of said compression plate, a collecting cup disposed rearwardly of the bucket a relatively small distance from the ground, and means operative by said jack for lifting said collecting cup and tipping the same upside down, in order to discharge its contents into said first mentioned cup in its lower position.

5. A traveling bucket for conveying refuse or other material, comprising in combination, a box structure, a compression plate reciprocable in said box structure in a direction transverse to its surface for compressing and distributing the refuse material in said box, at least one jack directly interposed between said box structure and said plate for actuating said compressing plate, at least one cup for said refuse material movably connected with said structure so as to allow lifting of the refuse material and discharging of the same into said box structure, a mechanism for transmitting the motion from said jack to said cup in order to operate said cup in cooperation with the working of said compression plate, a collecting cup disposed rearwardly of the bucket a relatively small distance from the ground, a lever pivoted to said box structure for pivotally supporting said collecting cup, and means including a chain which is operative both by said jack and said first mentioned cup for lifting said collecting cup and discharging the same into said first mentioned cup when the latter is at the lower end position of its range of movement.

6. A traveling bucket for conveying refuse or other material, comprising in combination, a box structure including a double wall at its rear end, a compression plate reciprocable in said box structure in a direction transverse to its surface for compressing and distributing the refuse material in said box, at least one jack directly interposed between said box structure and said plate for actuating said compressing plate, at least one cup for said refuse material movably connected with said structure so as to allow lifting of the refuse material and discharging of the same into said box structure, the cup being movable in the space between the elements of said double wall, at least one door in said double wall for loading refuse material into said cup, a mechanism for transmitting the motion from said jack to said cup in order to operate said cup in cooperation with the working of said compression plate, and means operative by said cup for opening and closing said door in accordance with the movement of said cup.

7. A transportable bucket for receiving and conveying refuse material and the like, comprising the combination of a box structure and a reciprocable plunger member having an unyielding portion engaging against said refuse material and being capable of moving back and forth in the rear portion of said box structure for shifting the refuse material forwardly from the rear of said structure and distributing the same therein, drive means interposed between said box structure and the plunger member for positively actuating said plunger member, a cup or skip for refuse material movably connected with the rear of said box structure and capable of lifting said refuse material up past said rear of the box structure and depositing the same in front of said unyielding portion of said plunger member, hinge means disposed at the upper rear portion of said box structure, means serving as a rear closure for said box structure and at least partly enclosing said skip throughout its path of movement as well as said reciprocable plunger member and connected to said hinge in order to allow outward swinging of said means and skip, as well as said plunger member as a unit and thereby open the rear of said box structure for emptying the same, and mechanism for elevating and lowering said cup mechanically intercommunicating and cooperating with the drive means of the plunger member and automatically causing said cup and said plunger member to operate together in predetermined manner.

8. A transportable bucket for receiving and conveying refuse material and the like, comprising the combination of a box structure and a reciprocable plunger member having an unyielding portion engaging against said refuse material and being capable of moving back and forth in the rear portion of said box structure for shifting the refuse material forwardly from the rear of said structure and distributing the same therein, drive means interposed between said box structure and said reciprocable plunger member for positively actuating said plunger member, a cup or skip for refuse material movably connected with the rear of said box structure and capable of lifting said refuse material up past said rear of the box structure and depositing the same in front of the unyielding portion of said plunger member, hinge means disposed at the upper rear portion of said box structure, hinge means also disposed at the lower rear portion of said box structure allowing the same to be rearwardly tipped, means serving as a rear closure for said box structure and at least partly enclosing said skip throughout its path of movement as well as said reciprocable plunger member and connected to said hinge in order to allow outward swinging of said means and skip, as well as said plunger member as a unit and thereby opening the rear of said box structure for emptying the same, and mechanism for elevating and lowering said cup mechanically intercommunicating and cooperating with the drive means of the plunger member and automatically causing said cup and said plunger to operate together in predetermined manner.

PIERRE ROTTEÉ.